(12) United States Patent
Nagai et al.

(10) Patent No.: US 9,755,206 B2
(45) Date of Patent: Sep. 5, 2017

(54) NONAQUEOUS ELECTROLYTE SECONDARY BATTERY HAVING SEPARATORS WITH BASE MATERIAL AND HEAT-RESISTANT LAYER ON COILING OUTER PERIPHERAL SIDE

(75) Inventors: Hiroki Nagai, Aichi (JP); Hiroyuki Akita, Seto (JP); Takumi Tamaki, Nisshin (JP); Katsushi Saito, Toyota (JP); Masato Kamiya, Anjo (JP); Shinji Suzuki, Kariya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 312 days.

(21) Appl. No.: 14/391,540

(22) PCT Filed: Apr. 10, 2012

(86) PCT No.: PCT/JP2012/059783
§ 371 (c)(1),
(2), (4) Date: Oct. 9, 2014

(87) PCT Pub. No.: WO2013/153619
PCT Pub. Date: Oct. 17, 2013

(65) Prior Publication Data
US 2015/0064529 A1 Mar. 5, 2015

(51) Int. Cl.
*H01M 2/14* (2006.01)
*H01M 2/16* (2006.01)
(Continued)

(52) U.S. Cl.
CPC ......... *H01M 2/1653* (2013.01); *H01M 2/166* (2013.01); *H01M 2/1686* (2013.01);
(Continued)

(58) Field of Classification Search
CPC .. H01M 2/1686; H01M 2/166; H01M 2/1653; H01M 10/0587; H01M 10/0431
(Continued)

(56) References Cited

U.S. PATENT DOCUMENTS

| 2009/0305129 A1* | 12/2009 | Fukui .................. H01M 4/134 429/200 |
| 2009/0325074 A1* | 12/2009 | Fukumoto ............. H01M 2/166 429/231.95 |

(Continued)

FOREIGN PATENT DOCUMENTS

| CN | 102197511 A | 9/2011 |
| JP | 2008-300362 | 12/2008 |

(Continued)

OTHER PUBLICATIONS

Yamashita et al., Machine translation of JP 2012-009150 A, Jan. 2012.*

*Primary Examiner* — Sean P Cullen
(74) *Attorney, Agent, or Firm* — Finnegan, Henderson, Farabow, Garrett & Dunner, LLP

(57) ABSTRACT

Provided is a nonaqueous electrolyte secondary battery 10 which, in cases where separators 70 each having a heat-resistant layer 74 on only one face thereof are used, has an excellent thermal stability and thus a higher safety and reliability when the battery 10 reaches a high temperature. Such a nonaqueous electrolyte secondary battery 10 includes a positive electrode 30 in which a positive electrode active material layer 34 is provided on both faces of a positive electrode current collector 32, a negative electrode 50 in which a negative electrode active material layer 54 is provided on both faces of a negative electrode current collector 52, at least two separators 70 each having a heat-resistant layer 74 on one face of a base material 72, and an electrolyte. The nonaqueous electrolyte secondary battery (Continued)

has an electrode assembly 20 in which the positive electrode 30 and the negative electrode 50 are stacked on top of one another with the separators 70 interposed therebetween. The at least two separators 70 are disposed in such a way that, for each separator, the heat-resistant layer 74 is positioned on the same side with respect to the base material 72 in the stacking direction.

9 Claims, 8 Drawing Sheets

(51) Int. Cl.
*H01M 2/18* (2006.01)
*H01M 10/0587* (2010.01)
*H01M 10/04* (2006.01)
*H01M 10/42* (2006.01)

(52) U.S. Cl.
CPC ... *H01M 10/0431* (2013.01); *H01M 10/0587* (2013.01); *H01M 2010/4292* (2013.01); *H01M 2220/20* (2013.01)

(58) Field of Classification Search
USPC .......................................... 429/144, 249, 251
See application file for complete search history.

(56) References Cited

U.S. PATENT DOCUMENTS

| | | |
|---|---|---|
| 2010/0068612 A1 | 3/2010 | Nishikawa |
| 2011/0171509 A1 | 7/2011 | Nakagiri et al. |
| 2011/0212357 A1* | 9/2011 | Umehara ................ H01M 2/16 429/144 |
| 2011/0250475 A1* | 10/2011 | Yamamoto .......... H01M 2/0277 429/7 |
| 2012/0202102 A1* | 8/2012 | Kakibe ................ H01M 2/145 429/143 |

FOREIGN PATENT DOCUMENTS

| | | | | |
|---|---|---|---|---|
| JP | 2011-175749 | | | 9/2011 |
| JP | 2011-253684 | | | 12/2011 |
| JP | 2012009150 | A | * | 1/2012 |
| JP | 2012-43629 | | | 3/2012 |

* cited by examiner

NONAQUEOUS ELECTROLYTE SECONDARY BATTERY HAVING SEPARATORS WITH BASE MATERIAL AND HEAT-RESISTANT LAYER ON COILING OUTER PERIPHERAL SIDE

CROSS-REFERENCE TO RELATED APPLICATIONS

This application is a national phase application of International Application No. PCT/JP2012/059783, filed Apr. 10, 2012, the content of which is incorporated herein by reference.

TECHNICAL FIELD

This invention relates to a nonaqueous electrolyte secondary battery, and more particularly to a nonaqueous electrolyte secondary battery having an electrode assembly in which a positive electrode, a negative electrode, and a separator having a heat-resistant layer are stacked on top of one another.

BACKGROUND ART

Nickel hydride batteries, lithium secondary batteries, and other nonaqueous electrolyte secondary batteries that can be charged and discharged have been of growing importance recently as on-board power sources for vehicles and as power sources for personal computers and handheld devices. In particular, lithium secondary batteries, which are lightweight and provide a high energy density, are well-suited for use as high-power on-board energy sources for vehicles.

This type of lithium secondary battery is typically built by housing, together with an electrolyte, an electrode assembly that is formed of a positive electrode and a negative electrode stacked on top of one another with a separator therebetween, within a case. Electrode constructions in such electrode assemblies that are known to the art include stacked electrode assemblies in a form obtained by stacking together a plurality of flat plate-like electrode assemblies, and coiled electrode assemblies in a form obtained by spirally coiling a continuous sheet-like electrode assembly. By adopting such constructions, the reaction surface area between the positive and negative electrodes is enlarged, enabling the energy density and power to be increased.

The separator here is typically made of resin, and has the role of electrically insulating between the positive electrode and the negative electrode and also the role of holding the nonaqueous electrolyte solution. In addition to these roles, to ensure the safety of the battery and the machine in which the battery has been installed, the separator also has the function of, when the battery interior overheats and reaches a given temperature region (typically the softening point or melting point of the resin), softening and thereby interrupting the charge carrier conduction path (referred to herein as "shutdown"). It is also desirable for this separator, because it is exposed to a reducing potential near the negative electrode and is exposed to a reducing potential near the positive electrode, to have a resistance to these environments (particularly an oxidation resistance to the oxidizing atmosphere at the positive electrode).

It has thus been proposed that such a separator have, on one or both faces of a base material composed of a conventional resin, a heat-resistant layer containing both an inorganic filler having heat resistance and a binder (see, for example, Patent Documents 1 and 2). For example, by providing such a heat-resistant layer on at least the surface of the separator on the side thereof facing the positive electrode, it is possible to prevent oxidative deterioration due to the positive electrode. Also, providing the separator with a heat-resistant layer enables the separator to maintain electrical insulation between the positive and negative electrodes even after shutdown, making it possible to prevent a leakage current from arising.

At the same time, over the past few years, progress has been made in achieving higher power in large secondary batteries adapted for use as, e.g., power sources for driving vehicles (such as lithium secondary batteries for hybrid automobiles). For instance, when a short circuit arises at the battery interior due to, for example, the inadvertent admixture of metal impurities, it is conceivable that a sudden rise in the battery temperature occurs. In such a case, the temperature near the short-circuit point on the surface of the negative electrode is even higher, and may reach several hundred degrees Celsius (e.g., 300° C. or more). Hence, in such large secondary batteries, the prevention of separator meltdown due to internal shorting by providing a heat-resistant layer on at least the surface of the separator on the side facing the negative electrode is also being investigated.

CITATION LIST

Patent Literature

Patent Document 1: Japanese Patent Application Laid-open No. 2011-253684
Patent Document 2: Japanese Patent Application Laid-open No. 2008-300362

SUMMARY OF INVENTION

However, in a separator having such a heat-resistant layer on both faces, because the thickness of the separator itself increases, the volumetric ratio and reaction surface area of the positive and negative electrodes that occupy a given volume decrease, which may directly bring about a decline in the battery capacity. To avoid such an influence, as shown in FIG. 8, for example, it is regarded as desirable to use separators 70 which, in accordance with the intended purpose, have a base material 72 provided on only one face thereof with a heat-resistant layer 74. FIG. 8 shows an example in which heat-resistant layers 74 are situated opposite a negative electrode 50. However, in cases where separators 70 having a heat-resistant layer 74 on only one face thereof were used, the face of the separator 70 on the side where a heat-resistant layer 74 has not been provided (that is, base material 72) softens when the battery reaches an elevated temperature due to overcharging or the like, as a result of which the mutually facing base materials 72 adhere to each other. If such adherence occurs, when the battery temperature rises and the separators 70 shrink, large stresses arise between the base materials 72 of the separators 70 and the edges (typically the corners) of the active material layers 34, 54 in the positive electrode 30 or the negative electrode 50, which may cause the separators 70 to break. This is undesirable as it may also become a cause of local shorting, or may increase the leakage current after battery shutdown.

This invention was conceived in order to resolve such problems in the conventional art. Accordingly, the object of the invention is to provide a nonaqueous electrolyte secondary battery in which, even in cases where separators provided with a heat-resistant layer on only one face thereof are used, the electrode assembly has an excellent thermal stability when the battery reaches elevated temperatures, thus conferring the battery with a higher safety and reliability.

That is, the nonaqueous electrolyte secondary battery disclosed herein is a nonaqueous electrolyte secondary battery (also referred to below simply as a "secondary battery" or a "battery") which includes a positive electrode in which a positive electrode active material layer is provided on both faces of a positive electrode current collector, a negative electrode in which a negative electrode active material layer is provided on both faces of a negative electrode current collector, at least two separators each having a heat-resistant layer provided on one face of a base material, and an electrolyte. This secondary battery is characterized by having an electrode assembly in which the positive electrode and the negative electrode are stacked on top of one another with the separators interposed therebetween, and also in that the separators are disposed in such a way that, for each separator, the heat-resistant layer is positioned on the same side with respect to the base material in the stacking direction.

In this secondary battery, the at least two separators are not disposed in such a way that the face on which the heat-resistant layer is provided lies opposite either the positive electrode or the negative electrode; instead, they are disposed in such a way that the heat-resistant layers for all the separators are positioned on the same side with respect to the base material. In other words, letting the face of the separator on which the heat-resistant layer is provided be the "front" and the face where the base material is exposed be the "back," the separator is disposed so that, in the stacking direction of the electrode assembly, the "front" of the separator always faces a fixed direction. That is, the front and back of the separators are not alternately disposed in such a way that, as shown in the conventional example depicted in FIG. 8, the "front, "back" and "front" of successive separators face in the upward direction in the diagram (see the subsequently described FIG. 4).

With such an arrangement, the base materials of the separators do not face each other, as a result of which the base materials do not adhere to one another and become attached. Also, adherence between the heat-resistant layers and the base materials does not arise. For this reason, even when the separators do shrink at an elevated temperature, it is possible to keep the separators from incurring local stresses and breaking. Hence, a secondary battery having a high thermal stability is provided which, even when the battery temperature has risen, minimizes the causes of internal shorting and reduces leakage current following battery shutdown.

Up until now, in both the positive electrode and the negative electrode, it was thought to be important to maintain the same state in the active material layer formed on one face of a current collector and in the active material layer formed on the other face. Hence, it has been commonly assumed by persons of ordinary skill in the art that the heat-resistant layers of separators as well, when placed opposite the active material layer on one face of a current collector, must always be placed opposite the active material layer on the other face. However, the inventors have discovered that, by rearranging the overall electrode assembly and thus placing the overall battery in a better state, it is possible to compensate for whatever effects arise when the states of the active material layers formed on both faces of the current collectors are caused to differ. The invention disclosed herein is based on this discovery and deliberately creates, on either side of a current collector, a state in which a heat-resistant layer is placed opposite an active material layer and a state in which a heat-resistant layer is not placed opposite an active material layer, thereby better arranging the state of the electrode assembly as a whole. Compared with conventional batteries, the secondary battery disclosed herein does not require new materials or complex manufacturing operations; instead, it achieves the outstanding effects mentioned above by dispelling standard, accepted notions and thinking "out of the box."

In a preferred embodiment of the nonaqueous electrolyte secondary battery disclosed herein, the electrode assembly is characterized by being constructed as a coiled electrode assembly in which the positive electrode, the negative electrode and the at least two separators are all formed as continuous sheets, the sheet-like positive electrode, negative electrode and at least two separators being stacked and coiled together.

By having the electrode assembly be a coiled electrode assembly, curved portions are formed in the electrode structure. At these curved portions, the coiling length on the coiling outer peripheral side is longer than that on the coiling inner peripheral side. As a result, at the curved portions, there arise, in active material layers on the coiling outer peripheral side of the electrode assembly and in active material layers on the coiling inner peripheral side, stresses having different orientations in the circumferential direction of coiling. That is, tensile stresses in the peripheral direction arise in the active material layers on the coiling outer peripheral side, whereas compressive stresses in the peripheral direction arise in the active material layers on the coiling inner peripheral side. For this reason, particularly in cases where the battery has reached a high temperature and heat shrinkage has arisen in the separator, the stresses generated between the active material layers and the separators on the coiling outer peripheral side are capable of increasing even further. If the base materials of the separators here adhere and attach to each other, such stresses will locally concentrate, increasing the possibility of separator breakage.

By contrast, with the arrangement disclosed herein, the problem of adherence between the base materials of the separators is resolved. Therefore, separate breakage is suppressed, and problems such as internal shorting and a rise in the leakage current following shutdown are suppressed. That is, by employing the arrangement disclosed here in a secondary battery provided with a coiled electrode assembly, the advantageous effects of the invention can be even more clearly obtained.

In a preferred embodiment of the nonaqueous electrolyte secondary battery disclosed here, the coiled electrode assembly is characterized by having a flattened shape that is squashed in a direction which is substantially perpendicular to a coiling axis. As noted above, by having the electrode assembly be a coiled electrode assembly, curved portions are formed in the electrode structure. Moreover, in the case of a coiled electrode assembly having a flattened shape, it is possible for the curvature of the curved portions to become substantially the largest at the endmost portions in the long direction within the coiling cross-section. Hence, the possibility of problems such as separator breakage and increased leakage current following shutdown arising is greater than in cylindrical coiled electrode assemblies which do not have a flattened shape. However, with the arrangement disclosed herein, the problem of adherence between separator base materials is resolved. Accordingly, problems such as separator breakage and increased leakage current after shutdown are suppressed, enabling the advantageous effects of the invention to be even more clearly obtained.

In a preferred embodiment of the nonaqueous electrolyte secondary battery disclosed herein, the separators are each disposed in such a way that the heat-resistant layer is positioned on a coiling outer peripheral side with respect to the base material. The electrode assembly is generally constructed in such a way that, to prevent charge carriers (lithium ions, in the case of a lithium secondary battery) which have oxidized at the positive electrode from depositing on the negative electrode surface, the width of the negative electrode is made wider than that of the positive electrode, thereby increasing the charge carrier receptivity (capacity) (see, for example, FIG. 4).

In detailed investigations by the inventors, the following phenomenon was observed at the curved portions in coiled electrode assemblies. As mentioned above, at these curved portions, because the coiling outer peripheral side has a longer coiling length than the coiling inner peripheral side, the balance in charge carrier receptivities between the mutually opposed positive electrode active material layer and negative electrode active material layer breaks down, leading to a tendency for charge carrier deposition to readily arise at the surface of the negative electrode active material layer positioned on the coiling outer peripheral side of the negative electrode current collector. If, in such a state, the heat-resistant layer of the separator is disposed so as to face the negative electrode active material layer positioned on the coiling outer peripheral side (that is, if the heat-resistant layer is disposed on the coiling inner peripheral side of the separator), it was found that charge carrier deposition proceeds into the heat-resistant layer, giving rise to a situation in which the negative electrode active material layer and the heat-resistant layer became firmly attached. As a result, in cases where the battery reached a high temperature and shrinkage of the separator arose, breakage of the separator occurred more easily.

By contrast, with the arrangement disclosed herein, because the heat-resistant layers of the separators are disposed on the coiling outer peripheral side, attachment to the negative electrode active material layer positioned on the coiling outer peripheral side does not occur. Therefore, separator breakage is suppressed, and so the cause of shorting is more reliably reduced, in addition to which it is possible to further lower the leakage current following battery shutdown.

In a preferred embodiment of the nonaqueous electrolyte secondary battery disclosed here, the base material includes at least a polyethylene layer made of polyethylene, and a oxidation-resistant resin layer made of a resin having a higher oxidation resistance than polyethylene, and the oxidation-resistant resin layer forms, in the base material, a surface on the opposite side from the surface having the heat-resistant layer. Moreover, in a preferred aspect, this resin having a higher oxidation resistance than polyethylene is made of polypropylene.

Because the separator thus constituted has a heat-resistant layer on only one side, the base material on the side where a heat-resistant layer has not been provided is exposed. Hence, it is desirable for this base material to soften and melt at a suitable temperature and thus have a shutdown function that blocks the current, and moreover to have, for example, oxidation resistance to the oxidizing atmosphere at the positive electrode. In the arrangement disclosed herein, the base material has at least two layers—a polyethylene layer and a oxidation-resistant resin layer, with the oxidation-resistant layer being exposed on the surface. In addition, the polyethylene layer serving as the intermediate layer between the heat-resistant layer and the oxidation-resistant layer may be provided with a shutdown function. It is possible to form these resin layers so as to be relatively thin compared with the inorganic filler-containing heat-resistant layer. Therefore, the separator having this base material, while retaining a smaller thickness, may have an oxidation resistance and durability such that deterioration does not arise from, for example, the oxidizing atmosphere at the positive electrode, and moreover may be endowed with a shutdown function at a given temperature.

In a preferred embodiment of the nonaqueous electrolyte secondary battery disclosed herein, at one positive electrode active material layer and one negative electrode active material layer which face one another across the intervening separator, a negative-to-positive capacity ratio ($C_N/C_P$), defined as a ratio of an initial charge capacity ($C_N$) of the negative electrode active material layer to an initial charge capacity ($C_P$) of the positive electrode active material layer, is from 1.5 to 1.9. As noted above, the ratio between the capacities of the positive electrode active material layer and the negative electrode active material layer which face each other across an intervening separator directly influences the battery capacity (or the irreversible capacity) and the battery energy density, which may in turn lead more readily to charge carrier deposition, depending on the battery service conditions such as high-speed charging. This may also increase the battery resistance. Hence, in the invention disclosed herein, by setting this negative-to-positive capacity ratio in the range of 1.5 to 1.9, the deposition of charge carrier under various battery service conditions is suppressed while at the same time maintaining battery characteristics such as battery capacity and energy density.

As described above, the nonaqueous electrolyte secondary battery disclosed herein resolves problems caused by adherence of the separator base material, has an excellent thermal stability when the battery reaches an elevated temperature, and moreover is capable of having a high safety and reliability. Such advantageous effects can be fully demonstrated particularly when this secondary battery is used as a large battery that is required to have a high capacity and high power characteristics. For example, such nonaqueous electrolyte secondary batteries may be advantageously used as batteries having one or more of the following characteristics: (1) an energy density of at least 500 Wh/L, (2) a capacity of at least 2.4 A, and (3) a power density of at least 1.5 kWh/L, and preferably having all of these characteristics (1) to (3). Accordingly, these nonaqueous electrolyte secondary batteries can be suitably used as driving power sources which are adapted for on-board use in vehicles such as automobiles and required to have a particularly high safety and reliability. In addition, as shown in FIG. 6, for example, this invention also makes it possible to provide a vehicle 1 such as an automobile equipped with such a nonaqueous electrolyte secondary battery 10 (which may be in the form of a battery pack 100) as the power source for a motor that drives the vehicle. The type of vehicle 1 is not particularly limited, and typically may be, for example, a hybrid car, an electric car or a fuel cell car.

DESCRIPTION OF EMBODIMENTS

In this specification, "secondary battery" refers in general to batteries which can be repeatedly charged and discharged by the movement of charge carriers, and typically includes, for example, nickel hydride batteries, lithium secondary batteries and lithium polymer batteries. Also, "active material" refers to a substance which can reversibly intercalate and deintercalate (typically insert and extract) a chemical species serving as the charge carrier in a secondary battery (such as lithium ions in a lithium secondary battery).

Preferred embodiments of the nonaqueous secondary battery disclosed herein are described below in greater detail while referring to the accompanying diagrams. Matters which are not specifically mentioned in the specification but which are necessary for working the invention will be understood as matters of design by persons of ordinary skill in the art which are based on related art in the field. The present invention can be practiced based on details disclosed in the specification and on common general technical knowledge in the field.

The nonaqueous electrolyte secondary battery disclosed herein substantially includes a positive electrode, a negative electrode, at least two separators, and an electrolyte.

Figure 4:
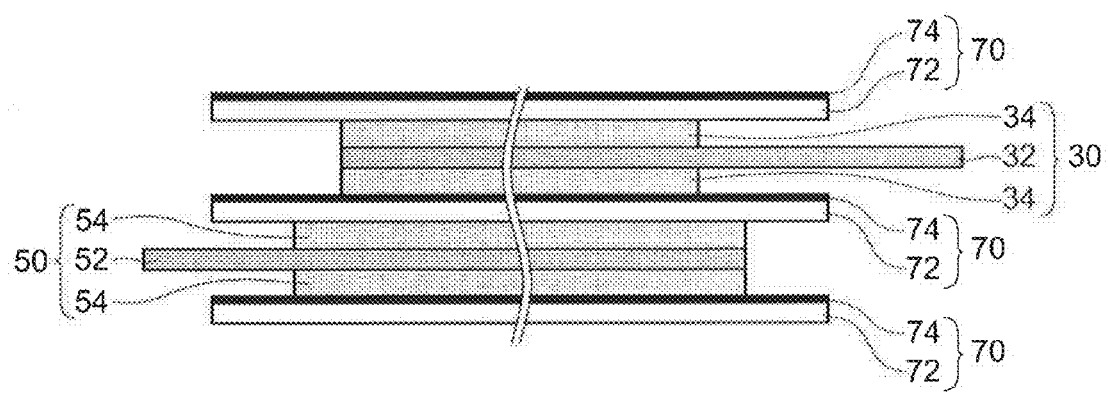
FIG. 4 is a schematic cross-sectional view taken along line IV-IV in FIG. 3.

This secondary battery, as shown in FIG. 4, for example, has an electrode assembly 20 made up of a positive electrode 30 and a negative electrode 50 that are stacked on top of one another, with separators 70 interposed therebetween. This electrode assembly 20 may be an electrode assembly 20 having formed therein only a single stacking unit formed of a positive electrode 30/a separator 70/a negative electrode 50/a separator 70, or may be an electrode assembly 20 having a multilayer structure in which this stacking unit is repeated two or more times. The positive electrode 30 has positive electrode active material layers 34 provided on both faces of a positive electrode current collector 32. The negative electrode 50 has negative electrode active material layers 54 provided on both faces of a negative electrode current collector 52. The separator 70 has a heat-resistant layer 74 provided on either one of the faces (a single face) at the surface of the base material 72.

Figure 3:
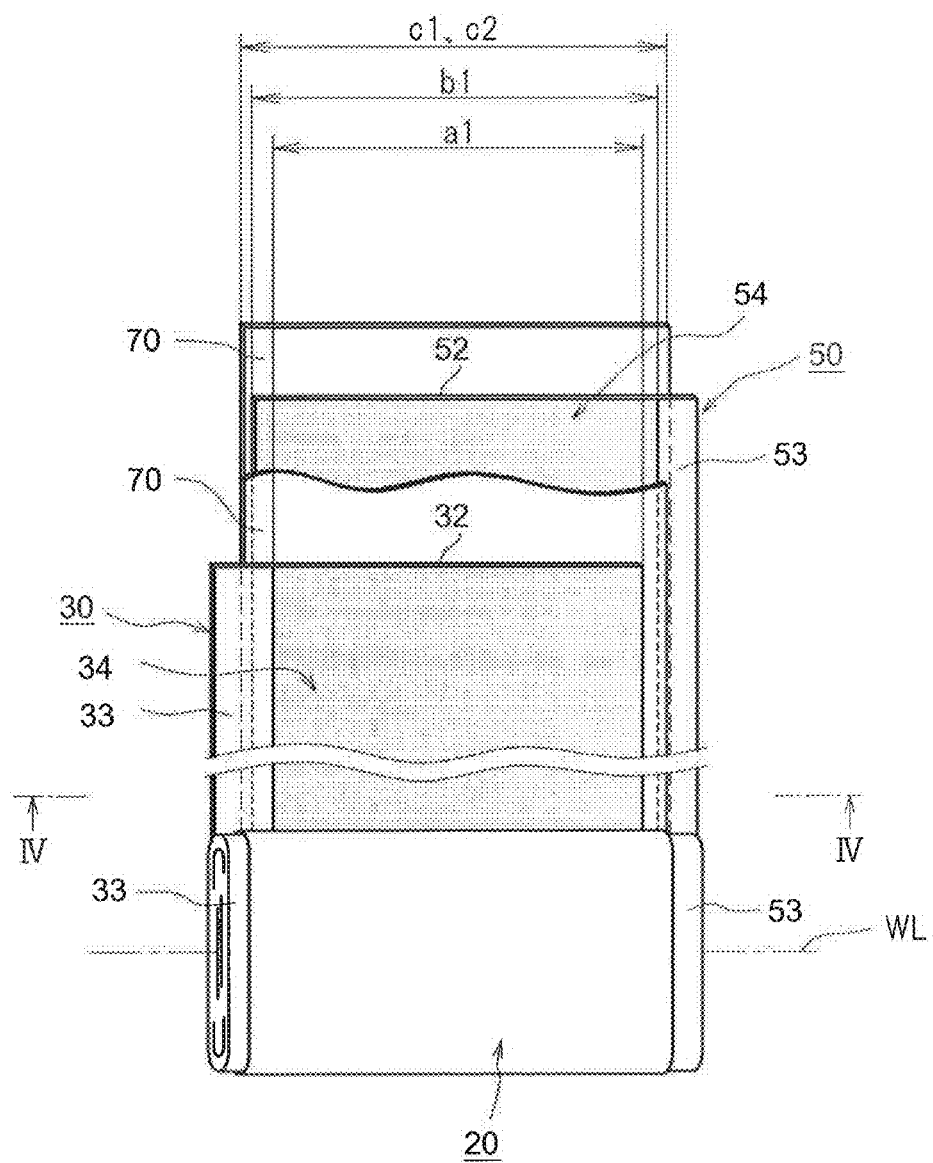
FIG. 3 is a diagram showing the structure of a coiled electrode assembly according to an embodiment of the invention.

Here, the positive electrode 30, as shown in FIGS. 3 and 4, for example, is typically provided at one edge in the width direction with a region where a positive electrode active material layer 34 has not been formed (uncoated region 33), leaving the positive electrode current collector 32 exposed. At the negative electrode 50 as well, there is provided at one edge in the width direction a region where a negative electrode active material layer 54 has not been formed (uncoated region 53), leaving the negative electrode current collector 52 exposed. The positive electrode 30 and the negative electrode 50 constitute, together with the two separators 70, a stacked structure, although the negative electrode active material layer 54 is often formed so as to have a larger width than the positive electrode active material layer 34. In such a case, the negative electrode active material layer 54 is placed so as to cover the positive electrode active material layer 34 in the width direction. At the same time, the positive electrode 30 and the negative electrode 50 are placed at a slight offset from one another so that the uncoated region 33 of positive electrode 30 and the uncoated region of negative electrode 50 jut out separately on one edge in the width direction and on the other edge. The separators 70 are formed more widely than the positive electrode active material layer 34 and the negative electrode active material layer 54 so as to reliably insulate these from each other. Accordingly, the separators 70 are placed so as to cover the positive electrode active material layer 34 and the negative electrode active material layer 54 in the width direction.

In the invention disclosed herein, the above separators 70 are all disposed with the heat-resistant layers 74 positioned on the same side of the base material 72 in the stacking direction, that is, in a direction perpendicular to the surface of the separator 70. In the example shown in FIG. 4, the heat-resistant layers 74 of the separators 70 are all placed on the top side of the base materials 72 in the diagram. With this arrangement, in the separators 70 situated above and below the positive electrode 30, the base materials 72 in the portions of the separators 70 which jut out beyond the positive electrode active material layers 34 do not face one another. Therefore, even when the temperature of the battery rises due to overcharging or the like, causing the separator 70 to soften, mutual adherence of the separators 70 situated above and below the positive electrode 30 is avoided. The same is also true for the negative electrode 50; namely, in the separators 70 situated above and below the negative electrode 50, the base materials 72 in the portions of the separators 70 which jut out beyond the negative electrode active material layers 54 do not face one another. Therefore, even when the temperature of the battery rises due to overcharging or the like, causing the separator 70 to soften, mutual adherence of the separators 70 situated above and below the negative electrode 50 is avoided.

Because the portions of the separators 70 which jut out beyond the active material layers 34 of the positive electrode 30 or the active material layers 54 of the negative electrode 50 do not mutually adhere and bind the edges, the generation and concentration of local stresses between the separators 70 and the positive electrode 30 or the negative electrode 50 can be suppressed. Therefore, damage to the separators 70 when the battery reaches a high temperature is suppressed in this secondary battery, enabling internal shorting and the generation of a leakage current following battery shutdown to be suppressed.

The electrode assembly 20 may be a stacked electrode assembly in the form of a plurality of flat planar electrode assemblies 20, each formed of a single above-described stacking unit (positive electrode 30/separator 70/negative electrode 50/separator 70) of a given shape, that are stacked together. Alternatively, it may be a coiled electrode assembly 20 of the sort shown in FIG. 3 which is obtained by spirally coiling a continuous sheet-like electrode assembly 20 formed of a single above-described stacking unit. In batteries having a coiled electrode assembly 20, the shape characteristics exert influences on the battery construction that are not observed in stacked electrode assemblies 20.

One such influence is that, because the coiled electrode assembly 20 has curved portions on the electrode surface, the coiling length is longer on the coiling outer peripheral side than on the coiling inner peripheral side. That is, the coiling outer peripheral side has a longer (larger) coiling length (volume) than the coiling inner peripheral side. Hence, compared with a flat, planar portion, in a curved portion, the electrode active material layers 34, 54 positioned on the coiling outer peripheral side between the opposing positive and negative electrodes 30, 50 are capable of having higher (larger) charge carrier receptivity characteristics (capacity). Accordingly, as shown in FIG. 3, the coiled electrode assembly 20 generally is coiled with the negative electrode 50 that must be set to a higher charge carrier receptivity placed on the bottom and the positive electrode 30 placed on top, so that the positive electrode 30 is on the inner side. At the curved portions of such a coiled electrode assembly 20, when the battery attains a high temperature and thermal shrinkage of the separators 70 has occurred, because the separators 70 shrink more on the coiling inner peripheral side than on the coiling surface, stress toward the coiling inner peripheral side may act in the coiling radial direction at the edges of the active material layers 34, 54 positioned on the coiling inner peripheral side of the separators 70. Therefore, in cases where, in a conventional arrangement, the base materials 72 of separators 70 adhere to one another and are restrained, areas where the stress that acts on the separator 70 becomes more concentrated arise, increasing the possibility of breakage by the separator 70.

By contrast, in the arrangement disclosed herein, the problem of adherence between the base materials 72 of separators 70 is resolved. As a result, the possibility of breakage by the separators 70 and of an increase in the leakage current following shutdown is reduced.

As shown in FIG. 3, the coiled electrode assembly 20 may be given a flattened shape that is squashed in a direction which is substantially perpendicular to the coiling axis, in accordance with the shape of the battery case. In such an arrangement, the curvature at the curved portions of the electrode assembly 20 is substantially not constant, and may become greatest at the center portion in the short direction of the coiling cross-section for the coiled electrode assembly 20 (that is, the site corresponding to the long axis). Therefore, at the center portion of this short direction, if the base materials 72 of the separators 70 adhere to each other and bind owing to a structure in accordance with the conventional art, the possibility of breakage of the separators 70 may increase even further than in cylindrical coiled electrode assemblies 20 that do not have a flattened shape. However, with the arrangement disclosed herein, the problem of adherence between the base materials 72 of separators 70 is resolved. Therefore, even in cases where a coiled electrode assembly having a flattened shape is provided, breakage of the separators 70 does not readily arise, problems such as internal shorting and an increase in the leakage current following shutdown are suppressed, and the advantageous effects of the invention can be more favorably obtained.

Figure 5:
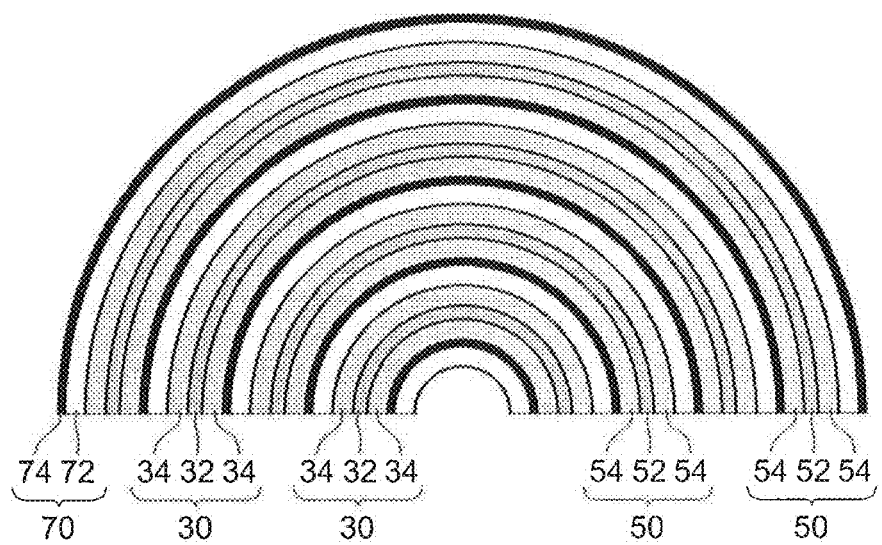
FIG. 5 is a schematic cross-sectional view showing the structure of a curved portion in a coiled electrode assembly according to an embodiment of the invention.
Figure 6:
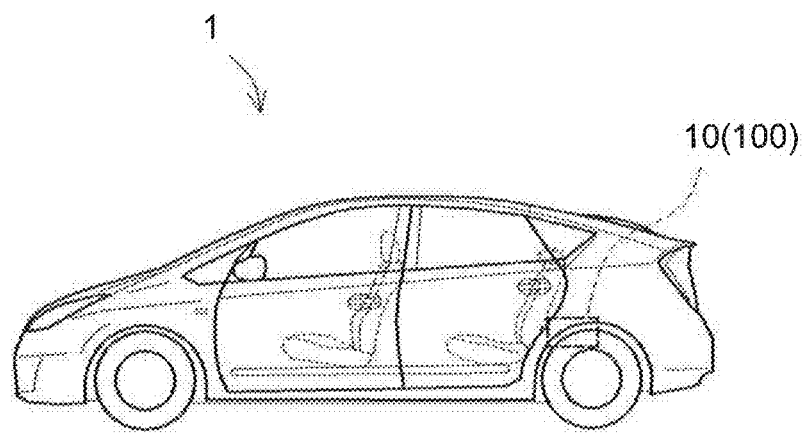
FIG. 6 is a side view schematically showing a vehicle equipped with a secondary battery according to an embodiment of the invention.

In addition, it was found that the following phenomenon is observed at the curved portions of the coiled electrode assembly 20. As mentioned above, the coiling length (volume) becomes longer (larger) on the coiling outer peripheral side than on the coiling inner peripheral side. Hence, at the curved portions, because the surface area of the positive electrode active material layer 34 on the coiling inner peripheral side facing the negative electrode active material layer 54 that is positioned on the coiling outer peripheral side of the negative electrode current collector 52 in the negative electrode 50 is larger than the surface area of the negative electrode active material layer 54, charge carrier deposition (in the case of a lithium secondary battery, the amount of metallic lithium deposited) tended to become higher on the surface of the negative electrode active material layer 54 positioned on the coiling outer peripheral side. Also, in some cases, at the site corresponding to the long axis in the flattened cross-section of the coiled electrode assembly 20, gaps arise between, successively, the positive electrode 30, the separator 70, the negative electrode 50 and the separator 70. Because such gaps result in an increase in internal resistance and produce a local overvoltage state, such sites were in a state where charge carrier deposition more readily arises. In addition, as shown in FIG. 5, at the active material layers 34, 54 on the coiling outer sides and the active material layers 34, 54 on the coiling inner sides of the current collectors 32, 52, the direction of the stresses incurred in the circumferential direction differs. Specifically, the active material layers 34, 54 on the coiling inner side incur tensile stresses in the coiling circumferential direction, and the active material layers 34, 54 on the coiling inner side incur compressive stresses in the coiling circumferential direction.

With the coiled electrode assembly 20 is in such a condition, by disposing the heat-resistant layer 74 of the separator 70 so as to face the negative electrode active material layer 54 positioned on the coiling outer peripheral side (that is, by disposing the heat-resistant layer 74 on the coiling inner peripheral side of the separator), charge carrier deposition grows within the heat-resistant layer 74 as well, and so the negative electrode active material layer 54 and the heat-resistant layer 74 become firmly attached. As a result, when the battery temperature rises such as in overcharging, the base material 72 of the separator 70 tries to shrink, yet tensile stresses in the circumferential direction arise at the negative electrode active material layer 54 and the heat-resistant layer 74 positioned on the coiling outer peripheral side, even further increasing the possibility that problems such as breakage of the separator 70 or an increase in leakage current following shutdown will occur.

By contrast, with the arrangement disclosed herein, because the heat-resistant layer 74 of the separator 70 is disposed on the coiling outer peripheral side, even should lithium deposit on the negative electrode active material layer 54 positioned on the coiling outer peripheral side, the two do not become attached. Therefore, the possibility of separator breakage due to adherence of the negative electrode active material layer 54 with the heat-resistant layer 74 positioned on this coiling outer peripheral side decreases, more reliably reducing the causes of shorting, and also making it possible to reduce leakage current following battery shutdown.

In the above nonaqueous electrolyte secondary battery, the heat-resistant layers 74 of the separators 70 are all disposed on the same side of the base material 72 in the stacking direction, and preferably on the coiling outer peripheral side. Therefore, the base materials 72 (or heat-resistant layers 74) of two neighboring separators 70 are arranged in such a way that one faces the positive electrode 30 and the other faces the negative electrode 50. Taking into consideration cases in which the base material 72 faces the positive electrode 30, it is desirable for the base material 72 to have a shutdown function and to be imparted with a high oxidation resistance. Hence, in this secondary battery, the base material 72 is provided with at least a polyethylene layer made of polyethylene, and a oxidation-resistant resin layer made of a resin having a higher oxidation resistance than the polyethylene. In a more preferred form, this oxidation-resistant resin layer forms the surface on the side opposite the surface of the base material 72 having the heat-resistant layer 74.

That is, the separator 70 has a heat-resistant layer 74 on one face, and an oxidation resistant layer on the other face. In addition, it has at least polyethylene (PE) as an intermediate layer therebetween. Because polyethylene is readily available and setting the softening point and melting point is easy, it is suitable as the material making up the layer that exhibits a shutdown function. The resin having a higher oxidation resistance than this polyethylene is not subject to any particular limitation. For example, various polymers having heat-resistance temperatures of at least 110° C. (e.g., 130° C. or more) may be used. Illustrative examples include polycarbonates such as polypropylene, polyimides, polyamideimides, polyamides, wholly aromatic polyamides, polyetherimides, polysulfones, polyethersulfones, and polymers made up of combinations thereof. Of these, use of the functional polymers referred to as engineering plastics, such as wholly aromatic polyamides, polyimides, polyamideimides, polysulfones and polyethersulfones, is also conceivable. These functional polymers may be materials which, in addition to oxidation resistance, also have excellent mechanical properties and chemical properties such as solvent resistance. However, it is generally sufficiently for this resin to have an oxidation resistance comparable to that of polypropylene (PP). Such a base material 72 may have a two-layer structure or a structure of three or more layers. From the standpoint of keeping the volume of the separator 70 smaller, it is more preferable for the base material 72 to have, for example, a two-layer structure (e.g., PP/PE) or a three-layer structure (e.g., PP/PE/PP). As a result, the separator 70 can maintain a smaller thickness, while yet having both an oxidation resistance and durability such that deterioration due to the oxidizing atmosphere at the positive electrode 30 does not arise, and also a shutdown function at a predetermined temperature.

Moreover, in the above secondary battery, suitably controlling the capacity ratio of a positive electrode active material layer 34 and a negative electrode active material layer 54 that are opposed across an intervening separator 70 is important not only for achieving good battery characteristics, but also for suppressing charge carrier deposition. This capacity ratio may vary depending on the use and service conditions of the battery, and is thus difficult to strictly limit. However, in the invention disclosed herein, at one positive electrode active material layer 34 and one negative electrode active material layer 54 that are opposed across an intervening separator 70, by setting the negative-to-positive capacity ratio ($C_N/C_P$), defined as the ratio of the initial charge capacity ($C_N$) of the negative electrode active material layer 54 to the initial charge capacity ($C_P$) of the positive electrode active material layer 34, in the range of generally from 1.4 to 2.0, such as from 1.5 to 1.9, the balance between these capacities is controlled within a desirable range. This negative-to-positive capacity ratio ($C_N/C_P$) may be set to, for example, 1.2 or more, although limiting it to 1.4 or more further increases the lithium receptivity of the negative electrode, enabling the deposition of lithium at the surface of the negative electrode active material layer 54 to be effectively suppressed even during rapid charging and the like. Setting the negative-to-positive capacity ratio ($C_N/C_P$) to, for example, at least 1.5, and more restrictively, to at least 1.6, is still more effective. On the other hand, if the negative-to-positive capacity ratio ($C_N/C_P$) exceeds 2.0 and is too large, the irreversible capacity value with respect to the initial capacity of the battery becomes large, and the battery capacity for a fixed volume (energy density) tends to become small, which is undesirable. It is therefore describe to set the negative-to-positive capacity ratio ($C_N/C_P$) to 1.9 or less, such as 1.8 or less.

The initial charge capacity may be measured by the following method. The method of measuring the initial charge capacity ($C_P$) of the positive electrode active material layer 34 described here is provided by way of illustration. A measurement cell (half-cell) is built using a positive electrode 30 composed of a positive electrode active material layer 34 on a positive electrode current collector 32 and die-cut to a predetermined size as the measurement electrode, and using a metallic lithium electrode as the counter-electrode. By carrying out on this measurement cell an initial charge-discharge cycle in which lithium ions are extracted from the positive electrode active material until the potential at the measurement electrode becomes 4.2 V (metallic lithium reference; the voltage of the metallic lithium reference is indicated below as "V(vs. Li/Li)," then lithium ions are inserted into this positive electrode active material (typically, lithium ions are inserted until the potential of the measurement electrode reaches 3.0 V (vs. Li/Li+)), the initial charge capacity per unit surface area of the positive electrode 30 (mAh/cm$^2$) is determined. This is multiplied by the positive electrode active material layer 34-forming surface area (cm$^2$) of the positive electrode 30 provided on the secondary battery, thereby calculating the initial charge capacity ($C_P$) of the positive electrode active material layer 34. The initial charge capacity ($C_N$) of the negative electrode active material layer 54 can be calculated in the same way as for the positive electrode 30 by, as in the case of the positive electrode 30, building a measurement cell with the negative electrode 50, carrying out an initial charge-discharge cycle in which lithium ions are inserted to the negative electrode active material until the potential of the measurement electrode becomes 0.02 V, then extracting lithium ions (typically, lithium ions are extracted until the potential at the measurement electrode becomes 1.5 V (vs. Li/Li+)). From the $C_P$ and $C_N$ obtained in this way, the negative-to-positive capacity ratio ($C_N/C_P$) between the positive electrode active material layer 34 and the negative electrode active material layer 54 can be determined.

The overall construction of the nonaqueous electrolyte secondary battery disclosed herein is described in greater detail below while suitably referring to FIGS. 1 to 4 and using for the purpose of illustration a lithium secondary battery 10 serving as a preferred embodiment. This lithium ion battery 10 is constructed with the heat-resistant layers 74 of the separators 70 arranged so as to face the same side.

The positive electrode 30 has, as mentioned above, positive electrode active material layers 34 provided on a positive electrode current collector 32.

A metal or alloy that has hitherto been suitable for the positive electrodes 30 of lithium secondary batteries can be advantageously used as the positive electrode current collector 32. For example, use can be made of a rod, plate, foil or mesh composed primarily of aluminum, nickel, titanium or stainless steel. In the present embodiment, a strip of aluminum foil of a predetermined width and having a thickness of about 1 μm is used as the positive electrode current collector 32. The positive electrode current collector 32 is provided with an uncoated region 33 along the edge thereof on one side in the width direction. Positive electrode active material layers 34 are formed on both sides of the positive electrode current collector 32, except in the uncoated region 33.

The positive electrode active material layer 34 includes at least a positive electrode active material. In this embodiment, the positive electrode active material layer 34 is composed primarily of a granular positive electrode active material and includes together with this a conductive material for increasing the electrical conductivity; these are anchored to the positive electrode current collector 32 with a binder. The positive electrode active material layer 34 is typically formed by feeding a positive electrode active material layer-forming composition which includes the positive electrode active material, a conductive material and a binder onto the positive electrode current collector 32. In the positive electrode active material layer 34 that has been formed in this way, voids into which the electrolyte solution can infiltrate are formed between the positive electrode active material particles.

Various materials capable of being used as the positive electrode active material in lithium secondary batteries 10 may be used here as the positive electrode active material. Specifically, materials which are capable of intercalating and deintercalating lithium can be used as the positive electrode active material. One, two or more of the various materials that have hitherto been used in lithium secondary batteries may be employed for this purpose without particular limitation. The use of a lithium-transition metal oxide (typically in granular form) as this positive electrode active material is preferred; an oxide having a layered structure or an oxide having a spinel structure may be suitably selected and used. For example, the use of one, two or more lithium-transition metal oxide selected from among lithium nickel-based oxides (such as $LiNiO_2$), lithium cobalt-based oxides (such as $LiCoO_2$) and lithium manganese-based oxides (such as $LiMn_2O_4$) is preferred.

As used herein, "lithium nickel-based oxides" refers to oxides which contain Li and Ni as the constituent metal elements, and also to composite oxides which additionally contain one, two or more metal element other than Li and Ni (i.e., transition metal elements and/or typical metal elements other than Li and Ni) in a smaller proportion than Ni (based on the number of atoms; in cases where two or more metal elements other than Li and Ni are included, each of these are present in a proportion smaller than Ni). Such metal elements may be one, two or more elements selected from the group consisting of cobalt Co, Al, Mn, Cr, Fe, V, Mg, Ti, Zr, Nb, Mo, W, Cu, Zn, Ga, In, Sn, La and Ce. The same applies to lithium cobalt-based oxides and lithium manganese-based oxides as well.

Alternatively, ternary lithium-transition metal oxides which contain three transition metal elements and have a composition of the general formula

$Li(Li_aMn_xCo_yNi_z)O_2$ (wherein a, x, y and z satisfy the conditions a+x+y+z≅1 and xyz≠0), and what are referred to as solid solution-type lithium-rich transition metal oxides of the formula

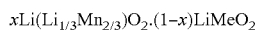

$xLi(Li_{1/3}Mn_{2/3})O_2 \cdot (1-x)LiMeO_2$ (wherein Me is one, two or more transition metal, and x satisfies the condition 0<x≤1) may be used. These lithium-transition metal oxides have been indicated by the above general formulas for the sake of simplicity, although it is possible of course for a portion (less than 50 atom %) of the transition metal elements in this formula to be substituted with one, two or more elements selected from the group of metal elements consisting of the Co, Al, Mn, Cr, Fe . . . shown above. Preferred examples of such lithium-transition metal oxides include lithium-rich transition metal oxides having a $D_{50}$ of from about 3 to 8 μm and a specific surface area (based on the BET method) of from about 0.5 to 1.9 $m^2/g$. By using a lithium-rich transition metal oxide, a solid solution-type lithium-rich transition metal oxide or the like as the positive electrode active material, it is possible to build a lithium ion battery endowed with both high power characteristics and high rate characteristics.

In this specification, $D_{50}$ indicates the average particle diameter, expressed as the 50% particle diameter (volume basis) in the cumulative particle size distribution measured by the laser diffraction scattering method. "$D_{50}$" and "average particle diameter" are used synonymously below.

The above positive electrode active material is also exemplified by polyanionic compounds of the general formula $LiMAO_4$ (wherein M is at least one metal element selected from the group consisting of Fe, Co, Ni and Mn; and A is selected from the group consisting of P, Si, S and V.

Such compounds making up the positive electrode active material may be furnished by preparation using a known method. For example, several starting compounds suitably selected according to the composition of the target positive electrode active material are mixed together in a predetermined ratio, and the resulting mixture is fired by suitable means. It is possible in this way to prepare an oxide as the compound making up the positive electrode active material. The method of preparing the positive electrode active material (typically, a lithium-transition metal oxide) is not itself in any way distinctive to the present invention.

The shape and other features of the positive electrode active material are not subject to any strict limitations, although the positive electrode active material prepared as described above can be size-reduced, granulated and classified by suitable means. For example, a lithium transition metal oxide powder substantially composed of secondary particles having an average particle diameter in the range of from about 1 μm to 25 μm (typically from about 2 μm to 15 μm) can be advantageously used as the positive electrode active material in the art disclosed herein. A granular positive electrode active material powder which is substantially composed of secondary particles having the desired average particle diameter and/or particle distribution can be thereby obtained.

The conductive material has the role of ensuring a conductive path between the positive electrode active material whose electrical conductivity is not all that high and the positive electrode current collector 32. Various kinds of materials having good conductivities may be used as this conductive material. Various kinds of electrically conductive materials having good conductivities may be used as this conductive material. For example, carbon materials such as carbon powder or fibrous carbon may be advantageously used. Specific examples include various carbon blacks (e.g., acetylene black, furnace black, graphitized carbon black, ketjen black), carbon powders such as graphite powder, and fibrous carbons such as needle graphite and vapor-grown carbon fibers (VGCF). These may be used singly or two or more may be used in combination. Alternatively, a conductive metal powder such as nickel powder may be used.

A polymer capable of dissolving or diffusing in the solvent used when forming the positive electrode active material layer 34 may be used as the binder. For example, when the positive electrode active material layer 34 is formed using an aqueous solvent, preferred use can be made of a water-soluble or water-dispersible polymer, examples of which include cellulosic polymers such as carboxymethylcellulose (CMC) and hydroxypropyl methylcellulose (HPMC), polyvinyl alcohol (PVA), fluorinated resins such as polytetrafluoroethylene (PTFE) and tetrafluoroethylene-hexafluoropropylene copolymer (FEP), vinyl acetate copolymers, and rubbers such as styrene-butadiene copolymers (SBR) and acrylic acid-modified SBR resins (SBR latexes). When forming the positive electrode active material layer 34 using a non-aqueous solvent, preferred use can be made of polymers such as polyvinylidene fluoride (PVdF), polyvinylidene chloride (PVdC) and polyacrylonitrile (PAN).

The positive electrode active material layer 34 can be formed by, for example, preparing a positive electrode active material layer-forming composition in the form of a paste (such as a slurry) wherein the above positive electrode active material, conductive material and binder and solvent are mixed together, coating the composition on the positive electrode current collector 32, then drying and spreading the composition. Any aqueous solvent or non-aqueous solvent may be used as the solvent in the positive electrode active material-forming composition at this time. A preferred example of a non-aqueous solvent is N-methyl-2-pyrrolidone (NMP). The polymer material mentioned as the binder may be used for the purpose of functioning not only as a binder, may also as a thickener or other type of additive in the positive electrode active material layer-forming composition. It is also possible to use a vehicle instead of the above solvent.

Also, although not subject to any particular limitation, the amount of the conductive material used per 100 parts by weight of the positive electrode active material may be, for example, from 1 to 20 parts by weight (preferably, from 5 to 15 parts by weight). The binder may be used in an amount of, for example, from 0.5 to 10 parts by weight per 100 parts by weight of the positive electrode active material.

The negative electrode 50 has a negative electrode active material-containing negative electrode active material layer 54 provided on a negative electrode current collector 52.

A metal suitable for the negative electrode is preferably used as the negative electrode current collector 52. For example, a rod, plate, foil or mesh composed primarily of copper, nickel, titanium or stainless steel may be used. In this example, a strip of copper foil having a predetermined width and a thickness of about 10 µm is used as the negative electrode current collector 52. An uncoated region 53 is provided along the edge on one side in the width direction of the negative electrode current collector 52. Negative electrode active material layers 54 are formed on both sides of the negative electrode current collector 52, except in the uncoated region 53 provided on the negative electrode current collector 52.

In this embodiment, the negative electrode active material layer 54 is composed primarily of a granular negative electrode active material; this negative electrode active material is anchored to the negative electrode current collector 52 with a binder. The negative electrode active material layer 54 is typically formed by coating a negative electrode active material layer-forming composition containing the negative electrode active material and the binder onto the negative electrode current collector 52. In the negative electrode active material layer 54 that has been formed in this way, voids into which the electrolyte solution can infiltrate are formed between the negative electrode active material particles.

One, two or more materials hitherto used in lithium ion batteries may be used without particular limitation as the negative electrode active material. An illustrative example is a granular carbon material (carbon particles) that includes in a least a portion thereof a graphite structure (layered structure). More specifically, the negative electrode active material may be, for example, natural graphite, graphite, non-graphitizable carbon (hard carbon), graphitizable carbon (soft carbon), any of these carbon materials that has been coated with amorphous carbon, or a carbon material which is a combination of two or more of these. Preferred use can be made of an amorphous carbon-coated graphite having a $D_{50}$ of from about 8 to 11 m and a specific surface area (according to the BET method) of from about 3.5 to 5.5 $m^2/g$.

The negative electrode active material used may be, for example, a metal compound (preferably a silicide or a metal oxide) that includes Si, Ge, Sn, Pb, Al, Ga, In, As, Sb, Bi or the like as a constituent metal element. For example, it is possible to use lithium titanium oxide (LTO) as negative electrode active material particles. As for a negative electrode active material composed of a metal oxide, use may be made of a granular material of excellent conductivity obtained by thoroughly coating the surface of a metal compound with a carbon film. In this case, a conductive material need not be included in the negative electrode active material layer, and the content of the conductive material indicated below may be set lower than when carbon coating is not carried out. Further aspects of these negative electrode active materials and features such as the particle diameter may be suitably selected according to the desired characteristics.

Also, a conductive material may be optionally included in the negative electrode active material layer 54. The conductive material may be used to ensure a conductive path between a negative electrode active material that does not have a high electrical conductivity and the negative electrode current collector 52. The conductive material in the above-described positive electrode active material layer may be similarly used here as the conductive material.

The materials mentioned above as binders, solvents and thickeners for the positive electrode active material layer 34 may be similarly used as the binder, solvent and thickener of the negative electrode active material layer 54.

Any of the aqueous solvents and nonaqueous solvents used in the above-described positive electrode active material layer 34 may be used here as the solvent. A preferred example of a nonaqueous solvent is N-methyl-2-pyrrolidone (NMP).

The polymer materials mentioned above as examples of the binder in the positive electrode active material layer 34 may be used for the purpose of functioning not only as a binder, may also as a thickener or other type of additive in the negative electrode active material layer-forming composition.

When a conductive material is used, the amount may be set to from about 1 to 30 parts by weight (preferably from about 2 to 20 parts by weight, such as from about 5 to 10 parts by weight) per 100 parts by weight of the negative electrode active material. The amount of binder used per 100 parts by weight of the negative electrode active material may be set to, for example, from 0.5 to 10 parts by weight.

The separator 70 is a component which electrically insulates between the positive electrode 30 and the negative electrode 50, and which holds the electrolyte and allows movement of the electrolyte. This separator 70 has a heat-resistant layer 74 provided on one face of a base material 72.

The base material 72 is not particularly limited, provided it is a porous material, nonwoven fabric, woven fabric or the like which is electrically insulating and has fine pores of a size that allows the lithium ions serving as the charge carrier to migrate. For example, preferred use can be made of a porous sheet made of resin (i.e., a microporous resin sheet).

This resin material is not substantially limited, the use of resin materials like those hitherto used in the art being possible. Illustrative examples include polyethylene (PE), polypropylene (PP), polystyrene, polytetrafluoroethylene, polyamide (most preferably aramid), polyimide, polyvinylidene fluoride, polyacrylonitrile and polyamideimide.

The base material 72 preferably has a shutdown function and oxidation resistance. For example, it is desirable for this to be given a multilayer structure (more preferably a two-layer structure or a three-layer structure) that includes at least a PE layer which exhibits a shutdown function and polypropylene (PP) having oxidation resistance. Although the shutdown temperature by the PE layer is not particularly limited, a suitable temperature may be selected and set in the temperature range of, for example, from about 80° C. to 130° C. The thickness of the base material 72 is not strictly limited, although it is desirable to set this to, for example, from about 10 µm to 30 µm, and more preferably from about 15 µm to 25 µm.

The heat-resistant layer 74 may include an inorganic filler and a binder to mutually bind the inorganic filler and also anchor the inorganic filler to the base material 72.

Various types of electrically insulating inorganic materials may be used as the inorganic filler. For example, use may be made of one, two or more inorganic material selected from among fillers such as metal oxides and metal hydroxides that are electrically insulating, glasses, and various inorganic minerals and inorganic pigments. Illustrative examples include alumina ($Al_2O_3$), boehmite ($Al_2O_3 \cdot H_2O$), magnesia (MgO), mica, talc, titania, glass beads and glass fibers. More preferred examples of such inorganic fillers include alumina ($Al_2O_3$) and boehmite ($Al_2O_3 \cdot H_2O$), which have a stable quality and moreover are inexpensive and readily available. The inorganic filler may be one having an average particle diameter ($D_{50}$) of from about 0.1 µm to 5.0 µm, and more preferably from about 0.2 µm to 2.0 µm. Preferred use may be made of such an inorganic filler having a specific surface area, as determined by the BET method, of from about 2.8 $m^2/g$ to 100 $m^2/g$.

A binder that is the same as the binder used in the positive and negative electrode active material layers 34, 54 may be suitably selected and used.

This heat-resistant layer 74 can be formed by, for example, preparing a paste-like (slurry-like) composition in which the above inorganic filler and binder have been mixed together in a solvent or a vehicle, then coating this onto one face of the base material 72 and drying. In cases where the base material 72 has a multilayer structure, the heat-resistant layer 74 is formed on the surface on the reverse side from the resin layer having a higher oxidation resistance. At this time as well, both aqueous solvents and non-aqueous solvents may be used as the solvent of the composition. A preferred example of a non-aqueous solvent is N-methyl-2-pyrrolidone (NMP). It is also possible for the polymer material mentioned above as a binder to be used also for the purpose of eliciting the function of a thickener or other additive in the composition. Although not particularly limited, the weight ratio of the binder in the heat-resistant layer 74 may be set to a desired value within a range of, for example, from 1 wt % to 60 wt %. The solid fraction of the heat-resistant-forming composition may be set to, for example, from about 30 wt % to 50 wt %. The solid fraction of the paste-like composition prepared when forming the heat-resistant layers 74 may be adjusted to typically about 40 wt % in the case of a solvent system, and to 50 wt % to 52 wt % in the case of an aqueous system. Of course, the amount of binder and the solid fraction are not limited to the above numerical values.

Although the thickness of the heat-resistant layer 74 formed is not subject to any strict limitations, it is desirable for this to be set to, for example, preferably from about 3 µm to 12 µm, more preferably not more than 7 µm, such as from about 2 µm to 5 µm, and more narrowly from about 4 µm to 5 µm.

It is desirable for the overall thickness of the separator 70 to be set to not more than about 40 µm, such as from about 15 µm to 35 µm, and more narrowly from about 20 µm to 30 µm.

It is desirable for the overall porosity of the separator 70, including the heat-resistant layers 74, to be set to, for example, at least 30% and not more than 70%, and preferably at least 40% and not more than 60%.

Figure 2:
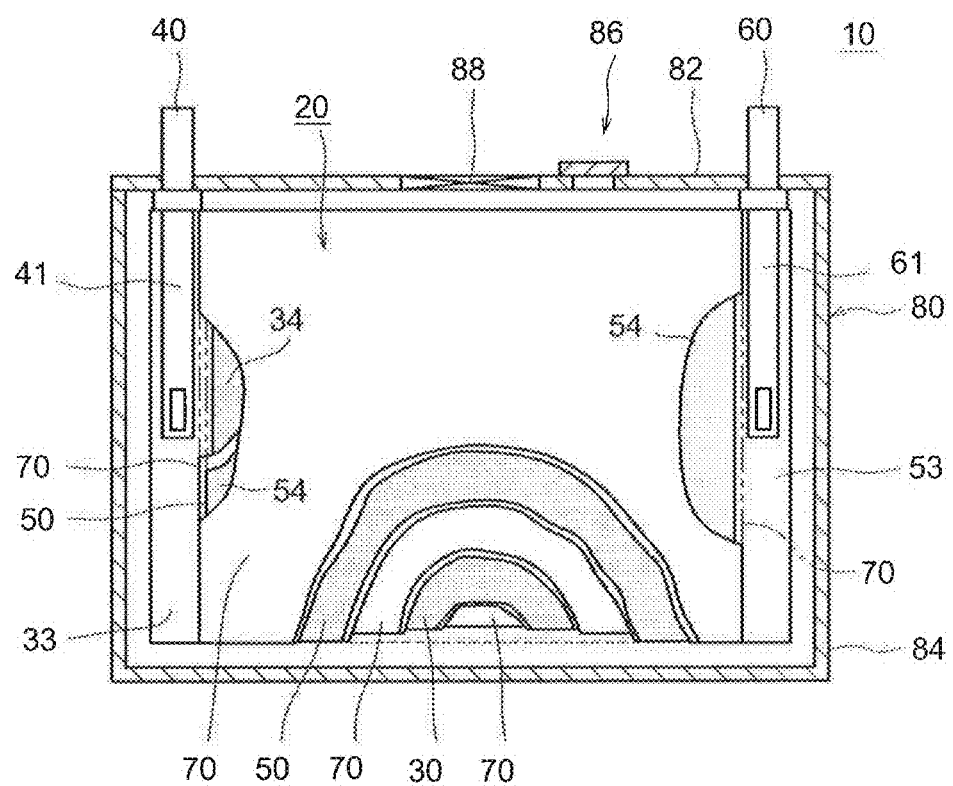
FIG. 2 is a sectional view taken along line II-II in FIG. 1.

In the examples shown in FIGS. 2 to 4, a strip of sheet material of a predetermined width and having a plurality of small pores is used as the separator 70. Here, the width b1 of the negative electrode active material layer 54 is a little wider than the width a1 of the positive electrode active material layer 34. Moreover, the widths c1 and c2 of the separator 70 are a little wider still than the width b1 of the negative electrode active material layer 54 (c1,c2>b1>a1).

Figure 1:
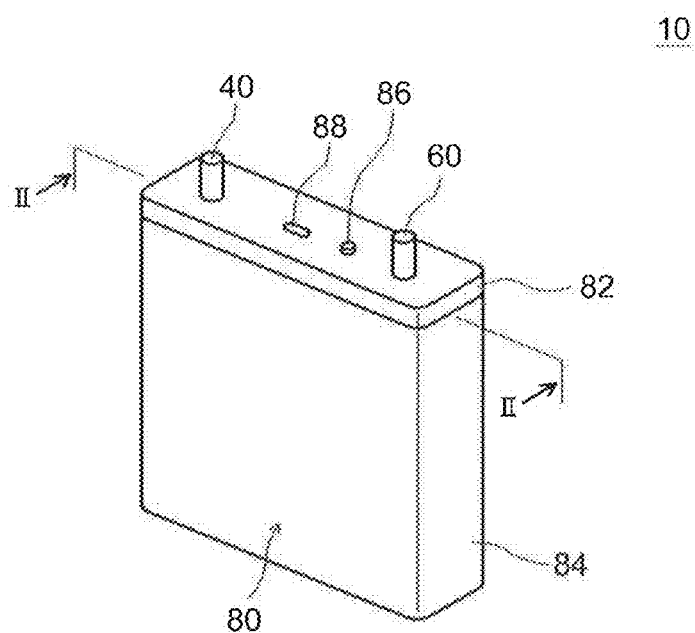
FIG. 1 is a perspective view schematically showing the exterior of a nonaqueous secondary battery according to an embodiment of the invention.

In this example, as shown in FIG. 1, the battery case 80 is a prismatic battery case and has a container body 84 and a lid 82. The container body 84 is a flat box-like container in the shape of a square tube closed on the bottom and open on one side (the top side in the diagram). The lid 82 is a member which is attached to the opening on top of the container body 84 and serves to close the opening.

In secondary batteries for installation in vehicles, to increase the fuel efficiency of the vehicle, it is desirable for the weight-to-energy efficiency of the battery (battery capacity per unit weight) to be increased. Accordingly, in this embodiment, a lightweight metal such as aluminum or an aluminum alloy is used in the container body 84 and the lid 82 which make up the battery case 80. By doing so, the weight-to-energy efficiency can be increased.

The battery case 80 has a flat, square interior space that serves as the space for housing the coiled electrode assembly 20. As shown in FIG. 2, the flat interior space of the battery case 80 is a little wider than the width of the coiled electrode assembly 20. A positive electrode terminal 40 and a negative electrode terminal 60 are attached to the lid 82 of the battery case 80. The positive and negative electrode terminals 40, 60 pass through the battery case 80 (lid 82) and emerge outside of the battery case 80. In addition, an electrolyte injection hole 86 and a safety valve 88 are provided in the lid 82.

As already explained, the coiled electrode assembly 20 has a continuous positive electrode (positive electrode sheet) 30, a continuous negative electrode (negative electrode sheet) 50, and two continuous separators 70. These separators 70 have a heat-resistant layer 74 on one face of a base material 72. When fabricating the coiled electrode assembly 20, in the example shown in FIG. 3, starting at the bottom, a separator 70, the negative electrode sheet 50, a separator 70 and the positive electrode sheet 30 are arranged on top of one another in this order. At this time, each separator 70 is placed over the underlying member, with the heat-resistant layer 74 of the separator 70 facing downward. The positive electrode sheet 30 and the negative electrode sheet 50 are arranged over one another at somewhat of an offset in the width direction, in such a way that the uncoated region 33 of the positive electrode active material layer 34 in the positive electrode sheet 30 and the uncoated region 53 of the negative electrode active material layer 54 in the negative electrode sheet 50 respectively jut out beyond both sides of the separators 70 in the width direction. The electrode assembly that has been stacked in this way is coiled in such a way that the negative electrode sheet 50 ends up on the outer peripheral side. That is, the heat-resistant layer 74 becomes positioned on the outer peripheral side with respect to the base material 72 of the separator 70. Next, the resulting coiled assembly is pressed and flattened from a direction perpendicular to the coiling axis WL, thereby producing a flattened coiled electrode assembly 20. It is possible in this way to build a coiled electrode assembly 20 in which the heat-resistant layers 74 do not face the negative electrode active material layer 54 on the coiling outer peripheral side.

A coiling core portion (that is, a portion where the positive electrode active material layer 34 of the positive electrode sheet 30, the negative electrode active material layer 54 of the negative electrode sheet 50, and the separators 70 are tightly stacked) is formed at the center portion in the coiling axis (WL) direction of the coiled electrode assembly 20. Also, the uncoated regions 33, 53 of the positive electrode sheet 30 and the negative electrode sheet 50 respectively protrude outward from the coiled core portion at both ends of the coiled electrode assembly 20 in the coiling axis direction. A positive electrode lead terminal 41 and a negative electrode lead terminal 61 are respectively provided at the positive electrode side protruding portion (i.e., the uncoated region 33 of the positive electrode current collector 32) and the negative electrode side protruding portion (i.e., the uncoated region 53 of the negative electrode current collector 52), and electrically connected to, respectively, the above-described positive electrode terminal 40 and the negative electrode terminal 60. At this time, due to the differences in the respective materials, ultrasonic welding may be used to connect the positive electrode lead terminal 41 and the positive electrode current collector 32. Resistance welding or the like may be used to weld the negative electrode lead terminal 61 and the negative electrode current collector 52. This coiled electrode assembly 20 is placed in the flat internal space of the container body 84, as shown in FIG. 2. After the coiled electrode assembly 20 has been placed therein, the container body 84 may be closed with the lid 82. The joint between the lid 82 and the container body 84 is, for example, welded and sealed by laser welding. In this example, the coiled electrode assembly 20 is positioned within the battery case 80 by the positive electrode lead terminal 41 and the negative electrode lead terminal 61 which have been secured to the lid 82 (battery case 80).

Next, the electrolyte is injected into the battery case 80 through the electrolyte injection hole 86 provided in the lid 82. One, two or more nonaqueous electrolyte of the same types as those used in conventional lithium secondary batteries may be used here without particular limitation as the electrolyte. These nonaqueous electrolytes typically have a composition that includes a lithium salt as the supporting salt in a nonaqueous solvent (typically an organic solvent). Preferred use can be made of a nonaqueous electrolyte which is in a liquid state at normal temperature (i.e., an electrolyte solution). Known lithium salts that have hitherto been used as supporting salts in nonaqueous electrolytes for lithium secondary batteries may be suitably selected and used as the lithium salt. Illustrative examples of such lithium salts include $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$ and $LiClO_4$. These supporting salts may be of a single type used alone or two or more may be used in combination. An especially preferred example is $LiPF_6$. In above nonaqueous electrolyte, the concentration of the supporting salt may be, for example, from about 0.1 mol/L to 5 mol/L. Preferred use can be made of a nonaqueous electrolyte solution containing the supporting salt in a concentration of from about 0.8 mol/L to 1.5 mol/L. Alternatively, the electrolyte may be a solid (gel-like) electrolyte solution obtained by adding a polymer to such a liquid electrolyte solution.

Exemplary nonaqueous solvents that may be used include aprotic solvents such as carbonates, esters, ethers, nitriles, sulfones and lactones. Illustrative examples include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane and γ-butyrolactone.

Various types of additives may be included in the electrolyte solution. For example, a compound which has an oxidation potential that is equal to or higher than the working voltage of a lithium secondary battery (e.g., at least 4.2 V in the case of a lithium secondary battery that fully charges at 4.2 V) and which generates a large amount of gas on oxidation may be used without particular limitation as an overcharge protection agent. For example, in a lithium secondary battery which achieves a fully charged state at 4.2 V, preferred use can be made of an overcharge protection agent having an oxidation reaction potential in the range of at least 4.6 V and not more than 4.9 V. Illustrative examples include biphenyl compounds, cycloalkylbenzene compounds, alkylbenzene compounds, organophosphorus compounds, fluorine atom-substituted aromatic compounds, carbonate compounds, cyclic carbamate compounds and alicyclic hydrocarbons. Specific examples include biphenyl (BP), alkylbiphenyl, terphenyl, 2-fluorobiphenyl, 3-fluorobiphenyl, 4-fluorobiphenyl, 4,4'-difluorobiphenyl, cyclohexylbenzene (CHB), trans-butylcyclohexylbenzene, cyclopentylbenzene, t-butylbenzene, t-aminobenzene, o-cyclohexylfluorobenzene, p-cyclohexylfluorobenzene, tris (t-butylphenyl)phosphate, phenyl fluoride, 4-fluorophenyl acetate, diphenyl carbonate, methyl phenyl carbonate, bis (tert-butylphenyl) carbonate, biphenyl ether and dibenzofuran. The use of cyclohexylbenzene (CHB) and cyclohexylbenzene derivatives is especially preferred. The amount of overcharge protection agent used per 100 wt % of the electrolyte solution used may be set to generally from about 0.01 to 10 wt %, and preferably from about 0.1 to 5 wt %.

The electrolyte solution used in this example is one obtained by including $LiPF_6$ in a concentration of about 1 mol/L in a mixed solvent of ethylene carbonate and diethyl carbonate (e.g., a mixed solvent having a volumetric ratio of about 1:1). A metal sealing cap is then attached (e.g., welded) to the electrolyte injection hole 86, thereby sealing the battery case 80.

In this lithium secondary battery 10, the positive electrode current collector 32 and the negative electrode current collector 52 are electrically connected to an external device via the electrode terminals 40, 60 which pass through the battery case 80. A lithium secondary battery 10, which is a type of a nonaqueous electrolyte secondary battery, is thereby provided.

In this lithium secondary battery 10, the heat-resistant layers 74 provided in the separators 70 are always disposed on the same side of the base material 72, and more preferably on the coiling outer peripheral side. Hence, even when the battery temperature becomes high due to an overcurrent or the like, the base materials 72 do not adhere to one another. Therefore, compared with an arrangement in which the base materials 72 are mutually opposed, the possibility of separator 70 breakage occurring is minimized. As a result, the problem of shorting caused by adherence between opposing base materials 72 is resolved, enabling the leakage current following battery shutdown to be reduced. Hence, a lithium secondary battery 10 is provided in which the electrode assembly 20 has a high thermal stability, and which thus has a better safety and reliability.

The nonaqueous electrolyte battery disclosed herein has been described above, although the detailed construction, form, capacity, applications and the like of this secondary battery are not limited by the foregoing examples. A secondary battery having a coiled electrode assembly was described in detail above in conjunction with diagrams for the purpose of illustration, but the invention disclosed herein may also be advantageously employed in a stacked electrode assembly. Also, a prismatic secondary battery was described, but the shape (e.g., metal housing, cylindrical, button-like, laminated film structure) and size of the battery case used in such batteries, and the constituent elements and other features of the positive and negative active materials are not particularly limited.

Next, working examples of the invention are described. However, it should be noted that in the following description given below the invention is not intended to be limited to these specific examples.

(Preparation of Test Cell)

A lithium secondary battery having a coiled electrode assembly was built by the following process.

<Separator>

In the formation of the heat-resistant layer of the separator, a heat-resistant layer-forming paste was prepared. This paste was prepared by mixing alumina ($D_{50}$, 0.9 μm; BET specific surface area, 18 m$^2$/g) as the inorganic filler, styrene-butadiene rubber (SBR) as the binder and carboxymethylcellulose (CMC) as the thickener, in a weight ratio among these materials of total inorganic filler:binder:thickener of 97:2:1, with ion-exchanged water. In preparation of the paste, mixing and kneading were carried out using an ultrasonic disperser (Clearmix, from M Technique Co., Ltd.) under the following conditions: preliminary dispersion, 5 minutes at 15,000 rpm; main dispersion, 15 minutes at 20,000 rpm.

Next, using a microporous film having the three-layer structure PP/PE/PP, where PP is polypropylene and PE is polyethylene, as the base material, the heat-resistant layer-forming paste prepared as described above was coated onto (A) only one side or (B) both sides of this base material. The base material thus obtained had a thickness of 20 μm and a shutdown temperature (PE layer softening point) of 128° C. The heat-resistant layer-forming paste was coated by a gravure coating process. The coating conditions were as follows. Coating was carried out using a gravure roll having 100 lines per inch and an ink holding capacity of 19.5 mL/cm$^2$, at a coating speed of 3 m/min, a gravure roll speed of 3.8 m/min, and a gravure speed/coating speed ratio of 1.27. After coating, the separator was dried, thereby producing a separator having a heat-resistant layer on one side. The overall separator thickness was 25 μm for (A) separators in which a heat-resistant layer was formed on only one side, and 30 μm for (B) separators in which heat-resistant layers were formed on both sides.

<Negative Electrode>

First, graphite surface-coated with amorphous carbon was prepared by the mixture and impregnation of 4 wt % of pitch in 96 wt % of natural graphite powder, followed by 10 hours of firing in an inert atmosphere at from 1,000° C. to 1,300° C. The resulting amorphous carbon-coated graphite had a $D_{50}$ of 10.5 μm and a BET specific surface area of 3.8 m$^2$/g.

Using the amorphous carbon-coated graphite as the negative electrode active material, this was mixed, together with a styrene-butadiene block copolymer (SBR) as the binder and carboxymethylcellulose (CMC) as the thickener in a weight ratio among these materials of 98.6:0.7:0.7, with ion-exchanged water, thereby preparing a negative electrode active material layer-forming paste. This paste was coated onto copper foil (thickness, 10 μm) as the negative electrode current collector, while leaving an uncoated region along one edge thereof, to a coating amount (coating weight) of negative electrode active material per unit surface area on both sides of 7.3 mg/cm$^2$ and dried. After drying, rolling was carried out with a rolling press to a negative electrode active material layer density of about 1.0 to 1.2 g/cm$^3$. This was slit to a predetermined width, thereby producing a negative electrode with a negative electrode active material layer having a width of 102 mm and a length of 3,200 mm.

<Positive Electrode>

Aqueous solutions of, respectively, nickel sulfate, cobalt sulfate and manganese sulfate were mixed in a given ratio and neutralized with sodium hydroxide, producing a precursor with a basic composition of $Ni_{0.34}Co_{0.33}Mn_{0.33}(OH)_2$. This precursor was mixed with lithium carbonate in a given ratio and then fired in open air for 24 hours in a temperature range of 800° C. to 950° C., thereby preparing a lithium-transition metal composite oxide having a composition of the general formula $Li_{1.14}Ni_{0.34}Co_{0.33}Mn_{0.33}O_3O_2$. This lithium-transition metal composite oxide had a $D_{50}$ of 6.0 μm and a BET specific surface area of 1.1 m$^2$/g.

Using this ternary lithium-rich transition metal composite oxide as the positive electrode active material, acetylene black (AB) as the conductive material, and polyvinylidene fluoride (PVDF) as the binder, a positive electrode active material layer-forming paste was prepared by mixing these materials in a weight ratio of 90:8:2 with NMP. The positive electrode active material layer-forming paste was then coated onto aluminum foil (thickness, 15 μm) as the positive electrode current collector, while leaving an uncoated region along one edge thereof, to a coating amount (coating weight) of positive electrode active material per unit surface area on both sides of 11.2 mg/cm$^2$ and dried, thereby forming a positive electrode active material layer. After drying, rolling was carried out with a rolling press to a positive electrode active material layer density of about 1.9 to 2.3 g/cm$^3$. This was slit to a predetermined width, thereby producing a positive electrode with a positive electrode active material layer having a width of 90 mm and a length of 3,000 mm.

<Assembly of Test Cell>

A lithium secondary battery for testing was built using two of the separators produced as described above and one each of the positive electrode and the negative electrode. That is, the positive electrode and the negative electrode, with a separator therebetween, were stacked in such a way as to mutually position the uncoated regions on opposite sides and have the negative electrode active material layer cover the positive electrode active material layer in the width direction, and were spirally coiled, then pressed into a flattened shape, thereby producing a coiled electrode assembly. The number of turns in the coiled electrode assembly was 30.

<Sample 1>
A coiled electrode assembly in which two separators (A), each provided with a heat-resistant layer on only one side, were arranged so that the heat-resistant layer of each separator faces the negative electrode active material layer was used as Sample 1.
<Sample 2>
A coiled electrode assembly in which two separators (B), each provided with heat-resistant layers on both sides, were arranged so that the heat-resistant layers of each separator face both the negative electrode active material layer and the positive electrode active material layer was used as Sample 2.
<Sample 3>
A coiled electrode assembly in which two separators (A), each provided with a heat-resistant layer on only one side, were arranged so that the heat-resistant layer of each separator faces the positive electrode active material layer was used as Sample 3.
<Sample 4>
A coiled electrode assembly in which two separators (A), each provided with a heat-resistant layer on only one side, were arranged so that the heat-resistant layer of each separator is positioned on the coiling outer peripheral side of the base material was used as Sample 4.

These coiled electrode assemblies were placed, together with a nonaqueous electrolyte, in aluminum prismatic battery containers and the batteries was sealed, thereby constructing lithium secondary batteries 1 to 4 for testing. The nonaqueous electrolyte used here was a solution obtained by dissolving 1.1 mol/L of LiPF$_6$ (LPFO) as the lithium salt and 0.025 mol/L each of lithium difluorophosphate (LiPO$_2$F$_2$) and lithium bisoxalate borate (Li[B(C$_2$O$_4$)]$_2$) as additives in a mixed solvent obtained by mixing together ethylene carbonate (EC), ethyl methyl carbonate (EMC) and dimethyl carbonate (DMC) in a volumetric ratio of 3:3:4.

Each of these lithium secondary batteries 1 to 4 for testing had a battery capacity of 3.8 Ah. The negative-to-positive capacity ratio for each, as determined from measurements of the initial charge capacities of the positive electrode active material layer and the negative electrode active material layer, was 1.8.

(Evaluation of Thermal Stability)
The thermal stabilities of the lithium secondary batteries 1 to 4 for testing built as described above were evaluated under the following conditions. In each case, after being subjected to a suitable initial conditioning treatment, the battery was forcibly shutdown by carrying out a continuous main charging test, and the magnitude of the leakage current thereafter was evaluated.

Specifically, initial conditioning treatment involved repeating two or three times the operation of constant-current charging for three hours at room temperature (25° C.) and a charge rate of 1/10C followed by charging at a constant current and voltage up to 4.1 V at a charge rate of 1/3C, and the operation of constant-current discharging to 3.0 V at a discharge rate of 1/3C.

The continuous main charging test involved carrying out low-current discharging at 0° C. to a state-of-charge (SOC) of 30%, then carrying out constant-current charging at a current of 60 A from 30% SOC to a maximum voltage attained of 40 V. In this continuous main charging test, the current value (leakage current value) for 10 minutes following shutdown of the battery was measured; the maximum current value during the 10-minute period is shown as the "leakage current" in Table 1.

Following the continuous charging test, the battery was disassembled and the condition of the electrode assembly was examined.

TABLE 1

| Sample | Heat-resistant layers | Position of heat-resistant layers | Leakage current (A) |
|---|---|---|---|
| 1 | (A) one side | both facing negative electrode | 2.4 |
| 2 | (B) both sides | both facing positive electrode and negative electrode | 2.6 |
| 3 | (A) one side | both facing positive electrode | 1.5 |
| 4 | (A) one side | both on coiling outer peripheral side of base material | 0.3 |

As is apparent from the results in Table 1, Samples 1 and 2 had much larger leakage currents than Samples 3 and 4. When Samples 1 and 2 were disassembled, it was confirmed that the separators on either side of the positive electrode had fused together in these batteries. Moreover, both Samples 1 and 2 have constructions in which the negative electrode active material layer on the coiling outer peripheral side and the heat-resistant layers on the separators face each other. In particular, it was observed that, at the negative electrode active material layer on the coiling outer peripheral side of the curved portions, a relatively large amount of lithium had deposited and that, in places, the deposited lithium had caused the separator and the negative electrode active material layer to mutually adhere. Based on these findings, in Samples 1 and 2, the negative electrode active material layer on the coiling outer peripheral side and the heat-resistant layers of the separator adhere due to metallic lithium, leading to separator damage in a relatively large number of places from shrinkage of the separators at the time of shutdown, which damage appears to be connected to the rise in the leakage current following shutdown.

On the other hand, Samples 3 and 4 have relatively small leakage currents, but the leakage current of Sample 4 is even lower than that of Sample 3. When Samples 3 and 4 were disassembled, the two separators on either side of the negative electrode had fused together in Sample 3, whereas adherence and attachment of the separators was not observed in Sample 4. Hence, in Sample 3, the mutually opposed separators fused together and, with further shrinkage during shutdown, invited separator breakage, which appears to have increased the leakage current following shutdown.

Yet, the lithium secondary battery of Sample 4 according to the invention disclosed herein, by having the heat-resistant layers disposed on the outer peripheral side of the base material, did not give rise to attachment of the separator to the negative electrode active material layer or to adherence between separators. Hence, places of breakage in the separators are minimized, which apparently results in a smaller amount of leakage current following shutdown and a good thermal stability.

Figure 7:
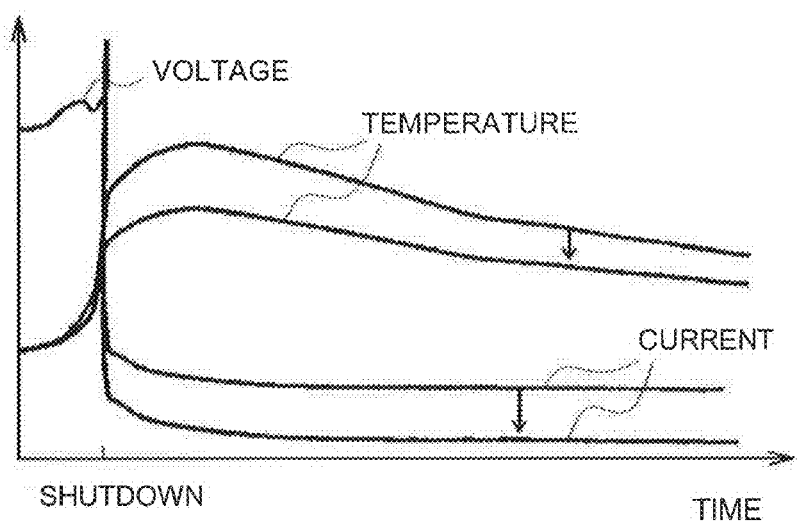
FIG. 7 is conceptual diagram illustrating battery behavior at the time of shutdown.
Figure 8:
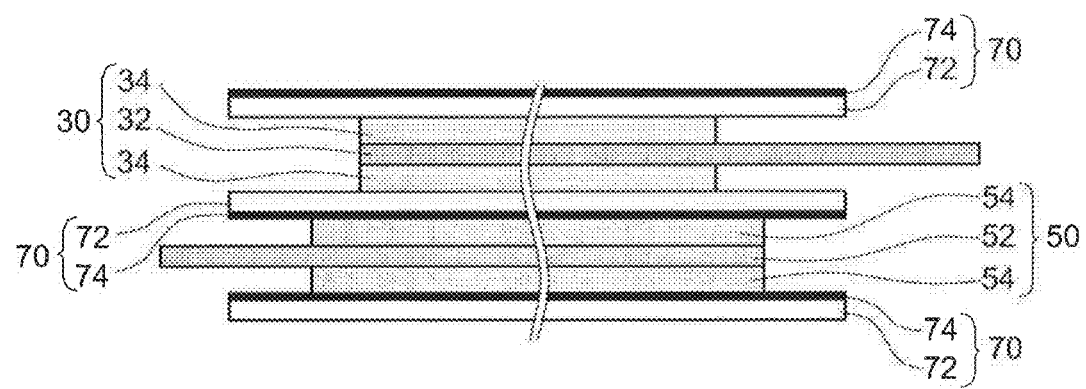
FIG. 8 is a schematic cross-sectional view showing an example of a conventional electrode assembly construction.

FIG. 7 schematically shows the current and temperature behavior of the batteries in Samples 3 and 4 following shutdown in this continuous main charging test. For both the temperature curves and the current curves, the top lines represent Sample 3 and the bottom lines represent Sample 4. Because Sample 4, compared with Sample 3, has a very small leakage current following shutdown, heat generation by the battery following shutdown is minimized, resulting in a battery temperature that is low overall and stable. It was thus confirmed that, owing to the invention disclosed herein, the battery maintains good thermal stability following shutdown due to overcharging and the like.

(Evaluation During Melt Down)

The same lithium secondary battery for testing as Sample 4 above was for use, and the battery state at the time of meltdown was checked. That is, the battery after the above-described initial conditioning was constant-current, constant-voltage charged up to 4.2 V at room temperature (25° C.) and a charge rate of 0.2C. A 5 kg weight was set on top of this battery, which was then placed in an oven. When the oven temperature had been raised to 200° C., the battery voltage state was examined. From this, an abrupt drop in voltage was not observed in heating up to 200° C., and it was confirmed that internal shorting caused by separator meltdown is prevented.

Preferred embodiments of the invention have been described above, although these do not in any way limit the scope of the claims, various modifications thereto being of course possible.

INDUSTRIAL APPLICABILITY

The art disclosed herein, by merely changing the method of arranging the separators having a heat-resistant layer on one side thereof, enables a nonaqueous electrolyte secondary battery to be obtained which has an excellent thermal stability even when the battery temperature rises due to overcharging and the like, and thus has a higher safety and reliability. With a nonaqueous electrolyte secondary battery of this construction, secondary batteries having a high safety and reliability can be provided, thus making it possible to also provide, for example, vehicles equipped with such secondary batteries as the power source for driving.

The invention claimed is:

1. A nonaqueous electrolyte secondary battery, comprising:
a coiled electrode assembly comprising:
a positive electrode, formed as a continuous sheet, comprising a positive electrode current collector and a positive electrode active material layer provided on both faces of the positive electrode current collector;
a negative electrode, formed as a continuous sheet, comprising a negative electrode current collector and a negative electrode active material layer provided on both faces of the negative electrode current collector;
two separators, formed as continuous sheets, each comprising a base material and a heat-resistant layer provided on only one face of the base material; and
an electrolyte, wherein:
the positive electrode and the negative electrode are stacked on top of one another with the separators interposed therebetween and coiled together, and
the two separators are each disposed in such a way that, in each of the separators, the heat-resistant layer is positioned on a coiling outer peripheral side with respect to the base material in the stacking direction.

2. The nonaqueous electrolyte secondary battery according to claim 1, wherein the coiled electrode assembly has a flattened shape that is squashed in a direction which is substantially perpendicular to a coiling axis.

3. The nonaqueous electrolyte secondary battery according to claim 1, wherein the base material of the separator includes at least a polyethylene layer made of polyethylene, and a oxidation-resistant resin layer made of a resin having a higher oxidation resistance than polyethylene, and
the oxidation-resistant resin layer forms, in the base material, a surface on the opposite side from the surface having the heat-resistant layer.

4. The nonaqueous electrolyte secondary battery according to claim 1, wherein the oxidation-resistant resin layer is made of polypropylene.

5. The nonaqueous electrolyte secondary battery according to claim 1, wherein, at one positive electrode active material layer and one negative electrode active material layer which face one another across the intervening separator, a negative-to-positive capacity ratio ($C_N/C_P$), defined as a ratio of an initial charge capacity ($C_N$) of the negative electrode active material layer to an initial charge capacity ($C_P$) of the positive electrode active material layer, is from 1.5 to 1.9.

6. The nonaqueous electrolyte secondary battery according to claim 1, wherein total thickness of the two separators are not more than 40 μm respectively.

7. The nonaqueous electrolyte secondary battery according to claim 1, wherein the heat-resistant layer comprises an inorganic filler, the inorganic filler has an average particle diameter of from about 0.1 μm to 5.0 μm and has a specific surface area, as determined by the BET method, of from about 2.8 m$^2$/g to 100 m$^2$/g.

8. The nonaqueous electrolyte secondary battery according to claim 1, the battery having at least one characteristic selected from the group consisting of (1) an energy density of at least 500 Wh/L, (2) a capacity of at least 2.4 A, and (3) a power density of at least 1.5 kWh/L.

9. A vehicle, comprising the nonaqueous electrolyte secondary battery according to claim 1 as a power source for driving the vehicle.

* * * * *